Aug. 31, 1954
I. WOLFF
2,688,132
RADIO ANGLE INDICATOR
Filed July 31, 1942
3 Sheets-Sheet 2
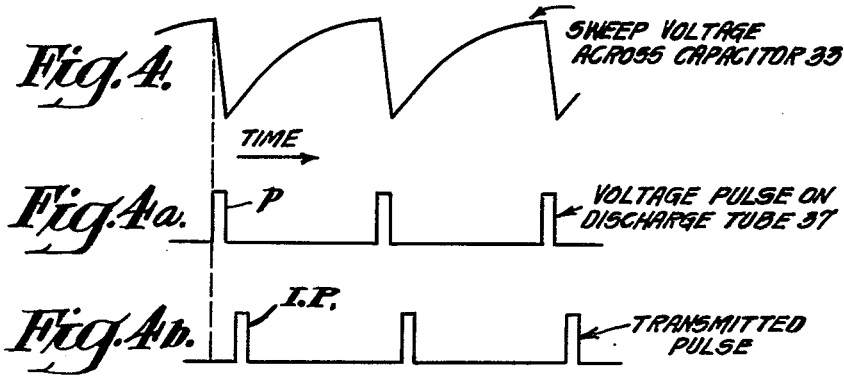
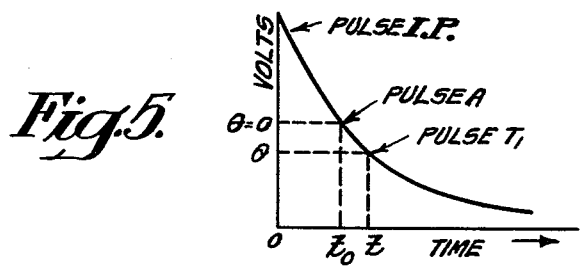
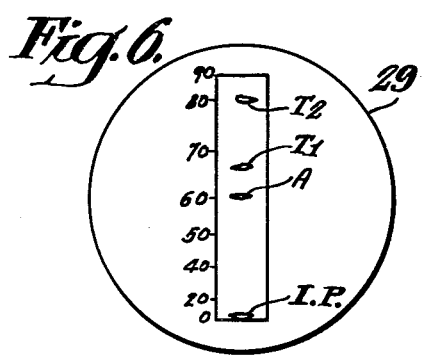
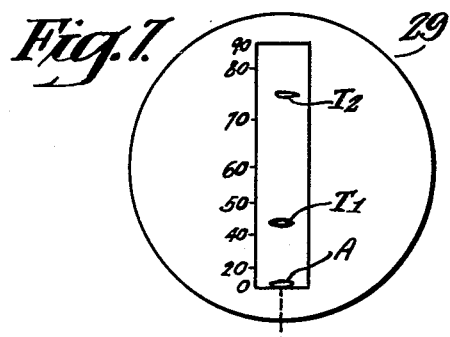
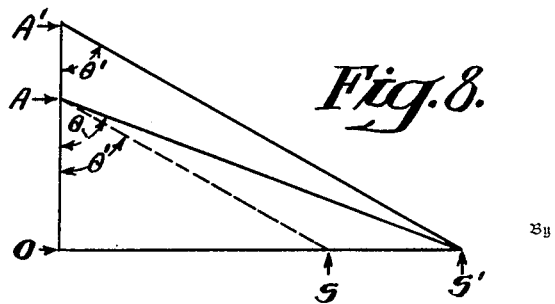
Inventor
Irving Wolff
By
CD Tuska
Attorney Aug. 31, 1954     I. WOLFF     2,688,132
RADIO ANGLE INDICATOR
Filed July 31, 1942     3 Sheets-Sheet 3
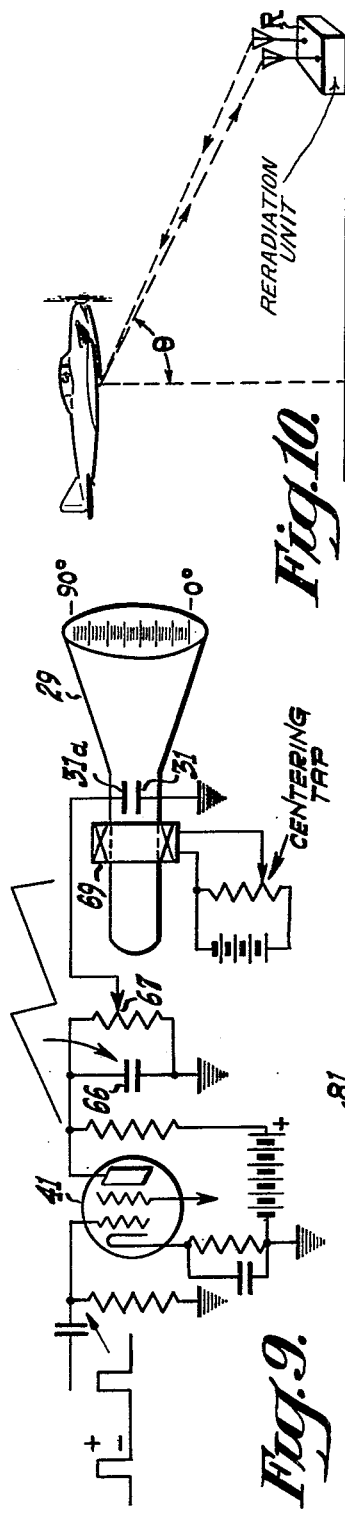
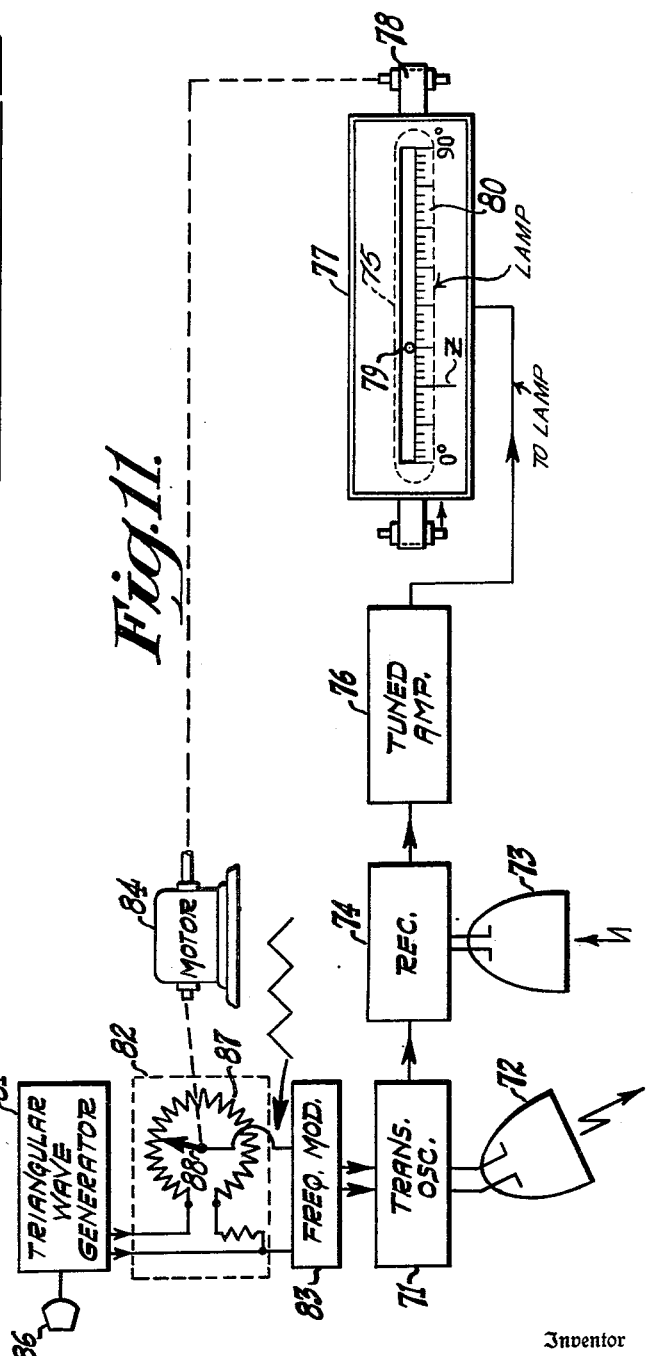
Inventor
*Irving Wolff*
Attorney Patented Aug. 31, 1954

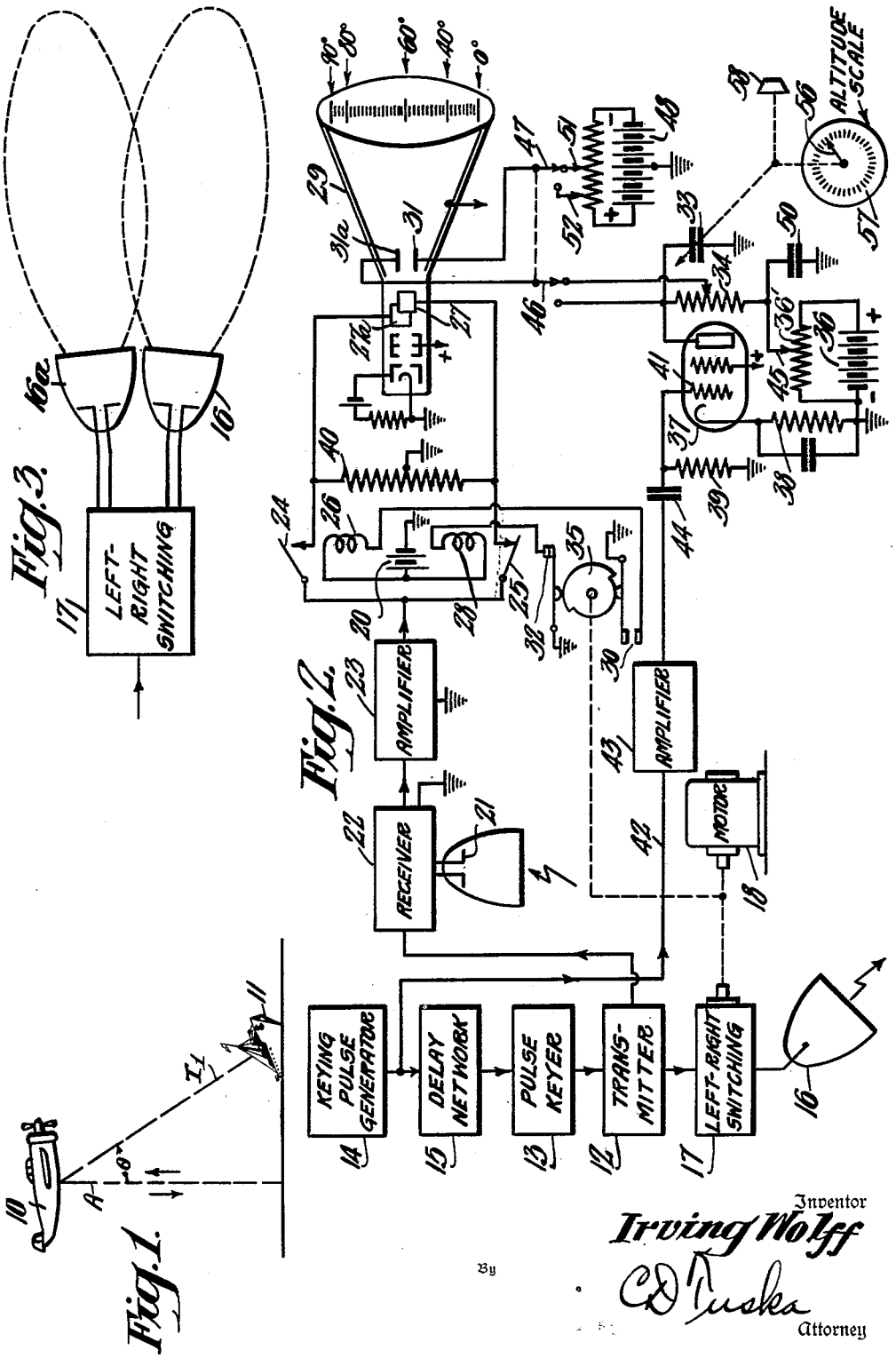

2,688,132

UNITED STATES PATENT OFFICE 2,688,132

RADIO ANGLE INDICATOR

Irving Wolff, Haddonfield, N. J., assignor to Radio Corporation of America, a corporation of Delaware Application July 31, 1942, Serial No. 452,989

17 Claims. (Cl. 343—16)

1

My invention relates to pulse-echo or similar systems for angle measurements and particularly to a radio system for measuring angles such as the angle formed by a line from an aircraft to an object on the earth's surface, and a perpendicular line from the aircraft to earth. The object may be a ship or other target to be bombed from the aircraft.

An object of the invention is to provide an improved method of and means for measuring an angle between lines joining a point of signal radiation and two points on a surface where one of the other angles of the triangle formed by said lines and a line between said two points on said surface is a fixed known angle.

A further object of the invention is to provide an improved system of the above-described type for determining the said angle between the perpendicular and the line to the target or other object.

A further object of the invention is to provide an improved system in which measurements of the said angle is independent of the altitude of the aircraft.

A further object of the invention is to provide an improved system of the above described type for determining the said angle even though the ship or other target is not visible.

A still further object of the invention is to provide an improved system of the above described type in which the angle measurement may be read directly from a scale or the like.

In one preferred embodiment of the invention an aircraft is provided with a radio pulse-echo system which radiates a signal downward and forward whereby reflections that are a measure of altitude will be received from the earth directly below the plane while other reflections will be received from the target ahead. Since the first occurring reflection will be a measure of the distance A perpendicular to the earth, the angle $\theta$ between this perpendicular line and the line from the aircraft to the target can be determined when the distance $T_1$ to the target is also known. The latter distance $T_1$ is shown by a later occurring reflection from the target. This, of course, is on the assumption that one of the other angles of the triangle formed by the two lines and by the earth's surface is known, as, for example, where the earth's surface is level, the known angle then being a right angle. From the fact that the distance to the target divided by the altitude is the secant of the angle $\theta$, assuming that the known angle is a right angle, for example, the angle $\theta$ may be calculated. In accordance with my invention, however, the apparatus is so designed that the angle $\theta$ is read directly off a scale without the necessity of any calculations.

As will be fully explained below, this may be accomplished by applying a sweep or timing voltage, which preferably is exponential, to one pair of deflecting plates of a cathode ray tube, the reflected pulses being applied to a second pair of deflecting plates in the tube. The altitude and target pulses A and $T_1$ appear adjacent to a scale on the cathode ray tube. When it is desired to determine the angle $\theta$, the time constant of the sweep voltage circuit is adjusted to bring the altitude pulse A to a predetermined point or mark on this scale. Since the distance on the scale, representing altitude is thus always made the same, the target distance on the scale represented by pulse $T_1$ is proportional to $\theta$ and the scale may be calibrated to give the angle $\theta$ directly.

The invention will be better understood from the following description taken in connection with the accompanying drawing in which Fig. 1 is a view showing an aircraft and a target and indicating the angle $\theta$ that is to be measured, Fig. 2 is a block and circuit diagram of apparatus embodying my invention, Fig. 3 is a plan view of the transmitter antenna system of Fig. 2, Figs. 4 and 4a are graphs of the sweep or timing voltage utilized in the receiver of Fig. 2 and of the discharge pulse initiating the sweep voltage, Fig. 4b is a graph showing the relation of the initial transmitted pulses to the sweep voltage, Fig. 5 is a graph showing the exponential discharge characteristic of a condenser in the sweep deflection circuit of Fig. 2, Fig. 6 shows the angle scale on the end of cathode ray tube of Fig. 2 and also shows the scale reading when the system is adjusted to read altitude, Fig. 7 is a view like Fig. 6 but for the condition when the system is adjusted to give a direct reading of the angle $\theta$, Fig. 8 is a diagram that is referred to in explaining the invention, Fig. 9 is a circuit diagram that is referred to in explaining another embodiment of the invention, Fig. 10 illustrates the use of my invention for maintaining a straight line glide path for landing an airplane, and Fig. 11 is a diagram showing an embodiment of the invention which utilizes a frequency modulated type of distance measuring system.

In the several figures, like parts are indicated by the same reference characters.

In Fig. 1 there is shown an aircraft 10 carrying the equipment shown in Fig. 2 and a ship or other target 11 that is to be bombed from the aircraft. The aircraft altitude A and the distance T₁ to the target are indicated by the dotted lines. The angle θ is to be determined.

In Fig. 2 a high frequency radio transmitter 12 is keyed by means of a pulse keyer 13 and a keying pulse generator 14 to radiate short radio pulses downwardly and forwardly from a suitable directive antenna system 16 and 16a (Fig. 3). The keying pulses preferably are applied to the keyer 13 through a delay circuit 15. The antenna system is shown as two dipoles in parabolic reflectors 16 and 16a which radiate in overlapping left hand and right hand radiation patterns as shown in Fig. 3. The two dipoles are connected alternately to the transmitter 12 by means of suitable left-right switching means 17 driven by a motor 18. The transmitted pulses may occur at the rate of 3500 per second and have a duration of 0.3 microsecond; the switching from left to right may occur at the rate of 30 per second. These values are given merely by way of example.

The reflected pulses are picked up by a suitable antenna such as a dipole 21 and supplied to a receiver 22 which amplifies and demodulates them. They are further amplified by an amplifier 23 and applied through switch arms 24 and 25 to a pair of deflecting plates 27a and 27 of a cathode ray tube 29. A resistor 49 with a grounded midpoint is connected across the deflecting plates 27 and 27a. The switch arms 24 and 25 are operated synchronously with the left-right antenna switching whereby the cathode ray of tube 29 is deflected to give a left indication when the antenna radiation is toward the left and to give a right indication when the antenna radiation is toward the right.

The alternate closing of switches 24 and 25 is effected by means of relay coils 26 and 28, respectively, which are energized by a voltage source 29 in response to the closing of cam operated switches 30 and 32, respectively. The cam 35 which operates switches 30 and 32 is driven by the motor 18 so that they open and close in synchronism with the left-right antenna switching.

The cathode ray tube 29 may be of conventional design and is provided with a second pair of deflecting plates 31 and 31a positioned at right angles to the other pair of plates. An exponential sweep or timing voltage is applied to the plates 31 and 31a to deflect the cathode ray vertically. This voltage is produced in a deflecting circuit comprising a variable capacitor 33 which is charged through a resistor 34 by a voltage source 36. Vertical sweep control may be provided by a variable tap 45 on a potentiometer resistor 36' connected across the source 36. A bypass condenser 50 is connected between the lower end of resistor 34 and ground. The discharge tube for capacitor 33 may be a screen grid tube 37 which is biased substantially to plate current cutoff by means of a bypassed cathode resistor 38, for example. A grid leak resistor 39 is connected between the control electrode 41 and ground. Capacitor 33 is discharged periodically by the application to electrode 41 of pulses P (Fig. 4a) from the pulse generator 14, these pulses being applied through a conductor 42, and amplifier 43 and a coupling capacitor 44.

The sweep voltage appearing across capacitor 33 is shown in Fig. 4. It has a wave shape that may be described as a non-linear sawtooth wave shape, the useful deflecting portion of the sawtooth being exponential, that is, being "bent over" in accordance with the charging of capacitor 33 through resistor 34 at an exponential rate. Preferably during each pulse P the capacitor 33 is almost completely discharged and at the end of each charging period it is almost fully charged. It is assumed, of course, that the voltage of source 36 remains constant.

In the particular equipment being described, the time constant of the sweep circuit 33—34 when set to measure the maximum altitude such as 20,000 feet is about one-fifth the period of the vertical sweep, this being the condition for the least amount of discharge of the capacitor 33 at the end of the sweep. Even for this condition the capacitor is substantially completely discharged; specifically, if the charging voltage from source 36 is 2000 volts, the capacitor 33 discharges to .7 or .8 volts which is such a small percentage of the charging voltage that the failure to discharge to zero volts does not affect the operation.

The sweep voltage may be applied to the deflecting plates 31 and 31a through a switch arm 46 which may be connected to the top of resistor 34 as shown to apply the full sweep voltage (the position for reading angle θ) or to the midpoint on resistor 34 to apply one-half full sweep voltage (the position of "set up"). A switch arm 47 which is ganged with switch arm 46 connects the plate 31 to a source 48 of centering voltage having a larger value when the deflecting plates are switched to a larger value of sweep voltage. With the switch 47 in either position the vertical or sweep deflection may be centered by adjusting the associated variable tap 51 or 52 on a potentiometer resistor connected across the voltage source 48.

The variable capacitor 33 is mechanically coupled to a dial pointer 56 associated with an altitude scale 57. Thus the pointer 56 rotates when a knob 58 is rotated to change the capacity of capacitor 33 for the purpose of "set up" and for obtaining altitude as explained below.

The method of determining the angle θ with the above described apparatus is based on the fact that if the two sides of a triangle including the unknown angle are reduced in length proportionally while keeping one of the other angles of the triangle constant, always bringing one of said sides to a predetermined length, then the angle formed by said two sides is determined by the length of the other of said two sides. This is illustrated in Fig. 8. In triangle OAS', the angle θ is a function of AS' only where AS' is the side of the triangle representing the target distance. If an angle scale is calibrated for a triangle having a vertical side of length OA, then the angle θ' for a larger triangle OA'S' may be found by reducing the side OA' to the length OA and reducing the side A'S' proportionally to the length AS. Now the angle θ' is a function of AS only.

The procedure in setting up and reading the altitude and angle is as follows:

(1) The switches 46 and 47 are thrown to the "set up" position shown in the drawing so that one-half the voltage across capacitor 33 is applied to the vertical deflecting plates 31 and 31a.

(2) The end of the vertical sweep or cathode ray trace is brought opposite the 90 degree mark on the angle scale (Figs. 6 and 7) by adjusting the vertical centering tap 51.

(3) The initial pulse I. P. is then brought opposite the 0 mark on the angle scale by means of the vertical size or sweep control tap 45 on the resistor 36'. It may be necessary to re-center to keep the end of the trace opposite the 90 degree mark.

(4) The altitude echo pulse A is next brought opposite the 60 degree mark, which is at the midpoint on the angle scale, by rotating the knob 58 and thereby adjusting the rate of discharge of capacitor 33. This is the adjustment that brings the voltage across capacitor 33 to one-half the initial value at the 60 degree mark and which makes the scale distance representing altitude the same regardless of the altitude of the aircraft. Rotation of the knob 58 also rotates the pointer 56 of the altitude scale from which the altitude may now be read.

(5) To expand the scale, the switches 46 and 47 are next moved to their "angle measuring" position putting the full sweep voltage on the vertical deflecting plates whereby the length of the vertical sweep is approximately doubled. An additional adjustment of the center tap on resistor 34, this tap being adjustable only within narrow limits, exactly doubles the voltage and brings altitude pulse A to the zero position as shown in Fig. 7.

(6) The angle $\theta$ for a target that reflects a pulse $T_1$ may now be read directly from the point on the angle scale opposite the pulse $T_1$. Similarly the angle $\theta$ for a more distant target may be read from the point on the scale opposite the pulse $T_2$.

The operation of the system is further illustrated in Fig. 5, where the outgoing pulse I. P. appears near the beginning of the exponential sweep. This is also shown by a comparison of Figs. 4 and 4b. The voltage across capacitor 33 at this instant is referred to as the initial voltage. Let $t_0$ be the time taken for a pulse to travel from the plane to the ground directly below and back, while $t$ is the time taken for the pulse to travel from the plane to a target at angle $\theta$ and back. Then when the capacitor 33 has been adjusted so that the altitude echo appears at the instant the capacitor voltage has fallen to one-half of the initial value $$t_0 = 0.7RC$$

where C is the capacity of capacitor 33 and R is the resistance connected across capacitor 33. Therefore, since R is a constant, C is a measure of the altitude A when the capacitor 33 is thus adjusted and the dial 57 may be calibrated to read altitude. The derivation of the equation $t = 0.7RC$ is as follows:

$$E = E_0 e^{-\frac{t_0}{CR}}$$

where $E_0$ is the initial capacitor voltage, C, R and $t_0$ are as defined above, and E is the instantaneous voltage across capacitor 33. If with a certain value of R and a certain adjustment of the value C:

$$\frac{t_0}{CR} = 0.7$$

Then $$E = \frac{1}{2} E_0$$

since $$e^{-0.7} = \frac{1}{2}$$

Therefore $$\frac{t_0}{CR} = 0.7 \text{ when } E = \frac{1}{2} E_0$$

or $$t_0 = 0.7RC$$

The "one-half voltage" mark is located at the zero on the angle scale when the switches 46 and 47 are thrown to the full voltage or angle measuring position and at 60 degrees on the angle scale in the half-voltage or "set up" position. Thus, referring to Fig. 6, we note that in the "set up" position the initial pulse is placed at zero on the angle scale while the altitude echo pulse A is placed by manual adjustment of knob 58 at the 60 degree mark located midway between the ends of the scale. By utilizing an exponential sweep voltage and by adjusting the time constant of the deflecting circuit to bring the altitude pulse A to a point on the scale where the sweep voltage is one-half full sweep voltage and then doubling the sweep voltage, I have obtained a well spaced angle scale in the region between 30 degrees and 70 degrees which is the region of most interest.

It should be understood that, if desired, the altitude pulse A may be brought to some point on the scale other than the one where the sweep voltage has fallen to one-half the initial value. The specific value of one-half is given merely by way of example. This being a value that together with an exponential sweep gives a well spaced angle scale.

Echo pulses $T_1$ and $T_2$ from two targets are shown in Figs. 6 and 7 for purpose of illustration. In the "angle measuring" position (Fig. 7) the sweep voltages are doubled but the end of the sweep located at 90 degrees on the scale is kept at the 90 degree mark. As a result, the initial pulse I. P. moves off scale entirely, as indicated in dotted lines, while the altitude echo pulse A moves to zero on the angle scale. Target echo pulses $T_1$ and $T_2$ move as a result of switching from the "set up" position to the angle measuring position to their positions shown on the angle scale so that the angle $\theta$ may be read directly off the scale. Thus, as illustrated in Fig. 7, $T_1$ is located at approximately 44 degrees and $T_2$ at approximately 74 degrees in the example illustrated. It may be noted that the echo pulses from a target at angle $\theta$ come on the scale at the distance X from the zero end of the scale that may be expressed by the equation $$X = \phi \theta S$$

where S is the total scale length in inches, and $$\phi \theta = 1 - 2e^{(\sec \theta)(\log_e \frac{1}{2})}$$

This equation is for the particular case where the altitude pulse is brought to a point on the scale where the sweep voltage has fallen to one-half the initial voltage.

From the foregoing, it will be seen that the altitude may be read from the dial 57 and the angle $\theta$ from the scale on the cathode ray tube 29. At the same time the indications reveal whether the target sought is to the right or left of line of flight of the aircraft. This is accomplished by the alternate antenna switching previously described which is done at a superflicker rate. A visual comparison of the amplitudes of the echoes from the left and right is made to determine the direction in which the target lies.

My invention may be practiced in a different manner than the one described above to give a direct angle reading. Instead of bringing the altitude pulse to a predetermined mark such as the 60 degree mark by adjusting the time constant of the deflecting circuit, the size of the vertical sweep is adjusted to bring the altitude pulse A opposite some predetermined scale mark while keeping one end of the trace fixed at the zero mark on the scale. The correct angle reading is now found opposite the target pulse $T_1$, the angle scale being different, of course, than for the first described method of operation. Fig. 9 illustrates by way of example a circuit that may be operated in this way. In this example the deflection is linear, a straight sawtooth wave appearing across a capacitor 66. The amplitude of the deflecting voltage that is applied to the deflecting plates 31 and 31a may be adjusted by moving the tap 67. The deflection trace may be centered by adjusting the flow of direct current in a magnetic deflecting coil 69.

Fig. 10 shows how my invention may be utilized for maintaining a straight line glide path for a blind landing. As the pilot loses altitude for a landing he watches the angle indication and keeps the angle $\theta$ constant, at the same time holding the altitude pulse at zero, whereby the airplane follows a straight line glide path. The landing field may have a reflecting marker on or near it which corresponds to the target previously referred to. In place of such a marker there may be a small relay or reradiation unit R. The use of a reradiation unit R is desirable since the reflection from ground is stronger than from a marker. Therefore, a comparatively low power transmitter may be used on the airplane if a reradiation unit is employed.

Fig. 11 shows my invention as applied to a distance measuring system which employs frequency modulation of the wave radiated from the aircraft or other transmitter location. In this system the basic operation is similar to that described in Bentley Patent 2,011,392 and in Espenschied Patent 2,045,071. A transmitter oscillator 71 radiates a frequency modulated signal from a dipole 72. This signal, after reflection, is picked up by a dipole 73 and supplied to a heterodyne receiver 74 which is also supplied with the frequency modulated signal directly from the transmitter 71. The resulting heterodyne or "difference frequency" is proportional to the length of the path of the received reflected signal times the modulation frequency times the amount of frequency sweep. This heterodyne signal is applied to a sharply tuned amplifier 76 which has its output circuit connected to a suitable indicator 77.

The particular indicator 77 illustrated is of the type described and claimed in Barton application Serial No. 380,805 filed February 27, 1941, now Patent No. 2,355,502. It comprises a moving belt 78 having an aperture 79 therein. Behind the belt 78 is a tubular neon light 75 or the like which is flashed when the amplifier 76 passes a signal. Thus, a flash of light appears as an index mark at a point opposite a scale 80 and the scale reading depends upon the location of the aperture 79 when the neon light flashes.

The frequency modulation of oscillator 71 is accomplished preferably by means of triangular or sawtooth voltage waves which are produced by a suitable generator 81 and supplied through a variable amplitude attenuator 82 to a frequency modulator 83. The attenuator 82 and the indicator belt 78 are driven synchronously by a motor 84. The modulator 83 may be some means for varying the capacity in a tuned circuit of the transmitter oscillator 71, as, for example, a reactance tube or the like which is controlled by the triangular wave. The frequency deviation of the oscillator 71 is thus proportional to the instantaneous amplitude of the triangular wave. The generator 81 need not be described in detail as generators for producing triangular waves and sawtooth waves are well known. As an example of sawtooth wave generators, reference is made to George et al. Patent 2,100,279 and to Tolson et al. Patent 2,101,520. A control knob for controlling the generator frequency is indicated at 86.

The amplitude attenuator 82 may be of any suitable type. It is shown, merely by way of example, as a potentiometer comprising a resistor 87 and a rotatable contact arm 88 which is coupled to the motor 84.

It will be evident that with generator 81 operating at a particular frequency, the "difference frequency" output of receiver 74 is proportional to the length of the path of the reflected wave times the peak amplitude of the triangular modulating wave since the amount of frequency deviation of the transmitter is proportional to said peak amplitude. In other words, for a given altitude or other distance, and for a given peak amplitude of the triangular wave occurring at a given frequency the receiver output has some definite frequency, such as 50,000 cycles per second, for example. Assuming, by way of example, that the amplifier 76 is tuned to pass signal only at 60,000 cycles, it will be apparent that for the example just assumed no signal could pass the amplifier 76 and the neon lamp would not light. However, the neon lamp will light as soon as the rotation of the potentiometer arm 88 changes the peak amplitude of the triangular wave to a value which makes the receiver output have a frequency of 60,000 cycles for the given distance to the reflecting object. Meanwhile, the aperture 79 has been moved along the scale 80 to a point where it will indicate the correct distance when a 60,000 cycle receiver output does flash the neon lamp.

Merely by way of example, it may be mentioned that the oscillator 81 may be adjustable to operate at frequencies from 60 to 600 cycles per second. The frequency sweep or frequency deviation of the radiated signal may vary from a sweep width of 10 megacycles to a width of 1 megacycle as the peak amplitude of the triangular wave is being reduced by the attenuator 82. The attenuator arm 88 and the indicator belt 78 may be rotated several times a second.

The apparatus of Fig. 11 may be utilized to measure the angle $\theta$ by employing the same principle of operation as previously described. The scale 80 is calibrated to read degrees when the index mark or aperture 79 is indicating altitude, or some corresponding distance, and is located opposite a predetermined scale mark, such as Z. To determine the angle $\theta$, the frequency adjusting knob 86 is operated to change the frequency or rate of occurrence of the triangular waves to a value that brings the altitude indication opposite the mark Z. The target indication or index mark will now appear opposite the correct angle reading just as in the previously described embodiments of the invention.

It should be understood that the frequency and attenuation controls of the system are interchangeable. Specifically, the motor 81 may drive the frequency control knob 86 to make the oscillator 81 change in frequency from 60 cycles per second to 600 cycles per second as the aperture 79 is simultaneously moved from one end of the scale to the other. In this case the attenuator arm 88 will be adjusted manually to bring the altitude index mark opposite the scale mark $Z$ for obtaining an angle reading.

Mention may be made of the fact that the Doppler effect may spread the index mark slightly along the scale. For example, when frequency modulation is by a triangular wave, the reflection from a target or the like may actually produce two separate altitude marks if the relative speed of the airplane and the target is high enough. This fact may be taken advantage of to determine at least approximately the ground speed of the airplane.

The system of Fig. 11 is described and claimed broadly in my copending application, Serial No. 452,990, filed on the same day as the present application, and entitled "Distance Measuring Apparatus," Patent No. 2,422,157 granted June 10, 1947.

I claim as my invention:

1. In apparatus including a source of radiation for measuring an angle between lines joining said source of radiation and two points on a surface, where one of the other angles of the triangle formed by said lines and by a line between said two points is a fixed known angle, distance measuring means including a cathode ray tube indicator having a screen and also including said source for radiating signal to said two points, said measuring means also including means for producing on said screen a cathode ray sweep trace on which distance indications appear for showing the distances from said source to said two points, and means for adjusting the positions of said distance indications on said cathode ray trace proportionally with one of said distance indications adjusted to a predetermined position so that the other distance indication gives a direct reading of said angle.

2. In apparatus including a source of radiation for measuring an angle between lines joining said source of radiation and two points on a surface where one of the other angles of the triangle formed by said lines and by a line between said two points is a fixed known angle, distance measuring means including said source for radiating signal to said two points, said measuring means also including means for producing index marks that show distance from said source to said two points, a scale adjacent to said marks, means for shifting the position of one of said index marks to make it appear at a predetermined position on said scale each time an angle is to be measured and means for simultaneously shifting the position of the other index mark a proportional amount whereby said first angle may be read directly from the position of the other index mark.

3. In apparatus for measuring an angle between lines joining a point of signal radiation and two points on a surface where one of the other angles of the triangle formed by said lines and by a line between the two points on said surface is a fixed known angle, a signal transmitter and a receiver located at said point of radiation, said receiver including indicator means for producing two index marks adjacent to an angle scale which has a certain scale factor M for both of said index marks which are at positions, respectively, that indicate the distances from said point of radiation to the two points on said surface, and means for changing said scale factor M of said indicator means to maintain one of said index marks at a predetermined position with respect to said scale whereby said first angle may be determined directly from the position of the other of said index marks, where the scale factor M is defined by the equation $P=f(MS)$, where P is the scale reading for the index mark, $f$ is a definite function, and S is the distance from the point of radiation to the point of reflection.

4. The method of measuring an angle between lines joining a source of radiation and two points on a surface where one of the other angles of the triangle formed by said lines and by a line between said two points is a fixed known angle, said method comprising radiating a signal from said source to said two points, receiving the reflected signal from said two points and producing index marks showing the distances from said source to said two points, and adjusting the positions of said index marks proportionally with one of said index marks adjusted to a predetermined point on a scale whereby said first angle may be read directly from the resulting position of the other index mark.

5. In a system for measuring the angle between lines joining a source of radiation and two points on a surface where one of the other angles of the triangle formed by said lines and by a line between said two points is a fixed known angle, an angle scale, indicating means for producing index marks adjacent to said scale, means for producing relative motion between said scale and said index marks in such a way that if the rate of relative motion of said index marks and said scale is changed at one point on said scale it is changed a proportional amount at every other point on said scale, means for transmitting a modulated signal toward the earth from said source and means for maintaining a certain time relation between the modulation of said signal and said relative motion, means for receiving said signal after reflection and for applying it to said indicating means to produce said index marks, and means for so adjusting the rate of said relative motion that the index mark representing distance from said source to one of said points is located at a predetermined position on the scale for each angle measurement whereby said angle may be read directly from the position of the index mark produced by the signal reflected from the other of said points.

6. In a system for measuring the angle between a line from an aircraft to an object on the earth's surface and a line perpendicular from the aircraft to the earth, an angle scale, indicating means for producing index marks adjacent to said scale, means for producing relative motion between said scale and said index marks in such a way that if the rate of relative motion of said index marks and said scale is changed at one point on said scale it is changed a proportional amount at every other point on said scale, means for transmitting a modulated radio signal toward the earth from said aircraft and means for maintaining a certain time relation between the modulation of said radio signal and said relative motion, means for receiving said signal after reflection and for applying it to said indicating means to produce index marks, and means for so adjusting the rate of said relative motion that the index mark representing altitude is at a predetermined position corresponding to a predetermined distance on the scale for each angle measurement whereby said angle may be read directly from the position on the index mark produced by the signal reflected from the object.

7. In a system for measuring the angle between a line from an aircraft to an object on the earth's surface and a line perpendicular from the aircraft to the earth, an angle scale, indicating means for producing index marks adjacent to said scale, means for producing relative motion between said scale and said index marks in such a way that if the rate of relative motion of said index marks and said scale is changed at one point on said scale it is changed a proportional amount at every other point on said scale, means for transmitting radio pulses toward the earth from said aircraft and means for maintaining a certain time relation between said pulse transmission and said relative motion, means for receiving said pulses after reflection and for applying them to said indicating means to produce index marks, and means for so adjusting the rate of said relative motion that the index mark representing altitude is at a predetermined position corresponding to a predetermined distance on the scale for each angle measurement whereby said angle may be read directly from the position on the index mark produced by the pulse reflected from the object.

8. In a system for measuring the angle between a line from an aircraft to an object on the earth's surface and a line perpendicular from the aircraft to the earth, an angle scale, indicating means for producing index marks adjacent to said scale, means for producing relative motion between said scale and said index marks in such a way that if the rate of relative motion of said index marks and said scale is changed at one point on said scale it is changed a proportional amount at every other point on said scale, means for transmitting a frequency modulated radio signal toward the earth from said aircraft and means for maintaining a certain time relation between said frequency modulation and said relative motion, means for receiving said signal after reflection and for applying it to said indicating means to produce index marks, and means for so adjusting the rate of said relative motion that the index mark representing altitude is at a predetermined position corresponding to a predetermined distance on the scale for each angle measurement whereby said angle may be read directly from the position on the index mark produced by the signal reflected from the object.

9. In a system for measuring the angle between a line from an aircraft to an object on the earth's surface and a line perpendicular from the aircraft to the earth, a cathode ray tube having a screen and means for directing the cathode ray against said screen, deflecting means for deflecting said ray along said screen in such a way that if the speed of the ray trace is changed at one point on said screen it is changed a proportional amount at every other point on said screen, means for transmitting radio pulses from said aircraft toward the earth and toward said object and means for initiating said deflection in a definite time relation to said pulse transmission, means for receiving said pulses after reflection from the earth and from said object and for applying them to modulate the cathode ray during said deflection, and means for so adjusting the speed with which said ray moves along said screen that the pulses reflected perpendicularly from the earth are made to appear at a predetermined point on said screen for each angle measurement whereby the position of the pulses reflected from said object indicates said angle.

10. In a system for measuring the angle between a line from an aircraft to an object on the earth's surface and a line perpendicular from the aircraft to the earth, a cathode ray tube having a screen and means for directing the cathode ray against said screen, deflecting means for deflecting said ray along said screen in such a way that if the speed of the ray trace is changed at one point on said screen it is changed a proportional amount at every other point on said screen, means for transmitting radio pulses from said aircraft toward the earth and toward said object and means for initiating said deflection in a definite time relation to said pulse transmission, means for receiving said pulses after reflection from the earth and from said object and for applying them to modulate the cathode ray during said deflection, and means for adjusting the time constant of said deflecting means whereby the pulses reflected perpendicularly from the earth may be made to appear at a predetermined point on said screen whereby the position of the pulses reflected from said object indicates said angle.

11. The invention according to claim 10 wherein an altitude indicating means is mechanically coupled to time constant adjusting means.

12. The invention according to claim 9 wherein means is provided to increase the amplitude of said deflection a predetermined amount for expanding the angle scale after said time constant is adjusted.

13. In a system for measuring the angle between a line from an aircraft to an object on the earth's surface and a line perpendicular from the aircraft to the earth, a cathode ray tube having a screen and means for directing the cathode ray against said screen, deflecting means for repeatedly deflecting said ray along said screen at a certain repetition rate in such a way that if the speed of the ray trace is changed at one point on said screen it is changed a proportional amount at every other point on said screen, said deflecting means including a capacitor across which the deflecting voltage appears and also including means for substantially completely charging and for substantially discharging said capacitor at said repetition rate, means for transmitting radio pulses from said aircraft toward the earth and toward said object and means for initiating said deflection at approximately the same time, means for receiving said pulses after reflection from the earth and from said object and for applying them to modulate the cathode ray during said deflection, means for adjusting the time constant of the circuit which includes said capacitor whereby the pulses reflected perpendicularly from the earth may be made to appear at a predetermined point on said screen with the aircraft at any desired altitude whereby the position of the pulses reflected from said object indicates said angle.

14. In a system for measuring the angle between a line from an aircraft to an object on the earth's surface and a line perpendicular from the aircraft to the earth, a cathode ray tube having a screen and means for directing the cathode ray against said screen, deflecting means for deflecting said ray along said screen in such a way that if the speed of the ray trace is changed at one point on said screen it is changed a proportional amount at every other point on said screen, means for transmitting radio pulses toward the earth and toward said object from said aircraft and means for initiating said deflection in a definite time relation to said pulse transmission, and means for receiving said pulses from the earth and from said object after reflection and for applying them to modulate the cathode ray during said deflection, means for so adjusting the rate at which said ray is moved along said screen that the length of the screen trace representing altitude is a predetermined length, and an angle scale located adjacent to said trace, said angle scale being calibrated on the basis of said predetermined length whereby said angle may be read directly from the position on the screen trace of the pulse reflected from the object.

15. A method of indicating on the screen of a cathode ray tube the angle between a line from an aircraft to an object on an object on the earth's surface and a line perpendicular from the aircraft to the earth, said method comprising transmitting radio pulses toward the earth and toward said object from said aircraft and initiating a sweep deflection of the cathode ray at approximately the time of transmission of each pulse and causing said ray to sweep along said screen in such a way that if the speed of the ray trace is changed at one point on said screen it is changed a proportional amount at every other point on said screen, receiving said pulses directly from the transmitter and also receiving them after reflection from the earth and from said object and applying them to alter the cathode ray during its sweep, adjusting the rate at which said ray moves along said screen during each sweep deflection to position the altitude indication on said sweep at a predetermined position for which an angle scale is calibrated so that said angle may be read directly from the position on the screen trace of the pulse reflected from the object.

16. A method of indicating on the screen of a cathode ray tube the angle between a line from an aircraft to a target on the earth's surface and a line perpendicular from the aircraft to the earth, said method comprising transmitting radio pulses toward the earth and toward said target from said aircraft and initiating a deflection of the cathode ray at approximately the same time and causing said ray to sweep along said screen in such a way that if the speed of the ray trace is changed at one point on said screen it is changed a proportional amount at every other point on said screen, receiving said pulses directly from the transmitter and also after reflection from the earth and said object and applying them to modulate the cathode ray during its sweep to produce indications corresponding to said pulses, changing the time constant of the cathode ray deflecting means to bring the altitude indication on said sweep to a predetermined position, next increasing the amplitude of said deflection to position said altitude indication at the position previously occupied by the indication produced by the directly received pulse whereby said angle may be read directly from the position on the screen trace of the pulse reflected from the target.

17. In apparatus for measuring an angle between lines joining a point of signal radiation and two points on a surface where one of the other angles of the triangle formed by said lines and by a line between the two points on said surface is a fixed known angle, a radio transmitter and a receiver located at said point of radiation, means for producing a periodic modulating wave that can be varied in amplitude and in frequency, means for frequency modulating said transmitter by said wave, means for heterodyning in said receiver said frequency modulated radio wave after reflection from the points on said surface with said frequency modulated radio wave received directly from said transmitter whereby a difference frequency is produced, an indicator comprising a scale and a relatively movable index marking means, a sharply tuned circuit connected to supply signal from said receiver to said indicator, means for repeatedly changing the position of said index marking means with respect to said scale in such a way that if the rate of relative motion of said index marking means and said scale is changed at one point on said scale it is changed a proportional amount at every other point on said scale and means for synchronously varying one of said two variable characteristics of the modulating wave, and means for adjusting the other of said variable characteristics to bring to a predetermined position the index mark showing the distance between the point of radiation and one of said points on said surface whereby said first angle may be read directly from the position of the other index mark with respect to the scale.

References Cited in the file of this patent

UNITED STATES PATENTS

| Number | Name | Date |
|---|---|---|
| 1,932,469 | Leib et al. | Oct. 31, 1933 |
| 2,225,046 | Hunter | Dec. 17, 1940 |
| 2,227,598 | Lyman et al. | Jan. 7, 1941 |
| 2,248,215 | Budenbom | July 8, 1941 |

FOREIGN PATENTS

| Number | Country | Date |
|---|---|---|
| 520,778 | Great Britain | May 3, 1940 |